(12) United States Patent
Yavuz (10) Patent No.: US 8,667,288 B2
(45) Date of Patent: Mar. 4, 2014

(54) SYSTEM AND METHOD FOR MESSAGE VERIFICATION IN BROADCAST AND MULTICAST NETWORKS

(75) Inventor: Attila Altay Yavuz, Pittsburgh, PA (US)

(73) Assignee: Robert Bosch GmbH, Stuttgart, DE (US)

(*) Notice: Subject to any disclaimer, the term of this patent is extended or adjusted under 35 U.S.C. 154(b) by 79 days.

(21) Appl. No.: 13/482,037

(22) Filed: May 29, 2012

(65) Prior Publication Data

US 2013/0326224 A1    Dec. 5, 2013

(51) Int. Cl.
*G06F 7/04* (2006.01)

(52) U.S. Cl.
USPC ............. 713/176; 713/177; 713/178; 726/23; 726/24; 726/25; 726/26

(58) Field of Classification Search
USPC ........................................................ 713/176
See application file for complete search history.

(56) References Cited

U.S. PATENT DOCUMENTS

| | | | |
|---|---|---|---|
| 6,772,339 B1 | 8/2004 | Jakobsson et al. | |
| 7,743,253 B2 | 6/2010 | Lauter et al. | |
| 8,280,039 B2* | 10/2012 | Futa et al. | 380/28 |
| 2005/0138379 A1 | 6/2005 | Semple et al. | |
| 2008/0301448 A1* | 12/2008 | Charles et al. | 713/176 |

OTHER PUBLICATIONS

Back, "Hashcash—A Denial of Service Counter-Measure", Article, Aug. 1, 2002, pp. 1-10 (10 pages).

Bellare et al., "Random Oracles are Practical: A Paradigm for Designing Efficient Protocols," appears in the proceedings of the First ACM Conference on Computer and Communications Security, Nov. 1993, pp. 1-21, USA (21 pages).

Bellare et al., "The Exact Security of Digital Signatures—How to Sign with RSA and Rabin," Appears in Advances in Cryptology—Eurocrypt 96 Proceedings, Lecture Notes in Computer Science, 1996, pp. 1-17, vol. 1070, Springer-Verlag, USA (21 pages).

Bergadano et al., "Chained Stream Authentication," In proceedings of the 7th Annual International Workshop on Selected Areas in Cryptography (SAC '00), 2000, pp. 144-157, Springer-Verlag, United Kingdom (14 pages).

Biryukov et al., "Structural Cryptanalysis of sasas," EUROCRYPT, 2001, pp. 394-405, Israel (12 pages).

Boneh et al, "Lower Bounds for Multicast Message Authentication," In Proceedings of the International Conference on the Theory and Application of Cryptographic Techniques: Advances in Cryptology, EUROCRYPT '01, 2001, pp, 437-452, Springer-Verlag, United Kingdom (16 pages).

Chang et al, "An Efficient Broadcast Authentication Scheme in Wireless Sensor Networks," In Proceedings of the 2006 ACM Symposium on Information, computer and communications security, ASIACCS '06, 2006, pp. 311-320, ACM, USA (10 pages).

(Continued)

*Primary Examiner* — Longbit Chai
(74) *Attorney, Agent, or Firm* — Maginot, Moore & Beck (57) ABSTRACT

In a network device, a method for verified communication includes generating a network communication message using a selection of predetermined message elements having digital signatures generated with a private key. The network device generates a signature for the message by applying a homomorphic operation to the digital signatures of the selected predetermined message elements and to a one-time signature corresponding to a random number. The network device transmits the message in association with the signature for the message and the random number to at least one other network device.

26 Claims, 6 Drawing Sheets

(56) References Cited

OTHER PUBLICATIONS

Dutta et al, "Pairing-Based Cryptographic Protocols : A Survey," Cryptology Research Group, Stat-Math and Applied Statistics Group, published at least as early as May 29, 2012, pp. 1-45, India (45 pages).

Goldreich et al, "How to Construct Random Functions," Journal of the Association for Computing Machinery, Oct. 1986, pp. 792-807, vol. 33, No. 4, USA (15 pages).

Guo et al, "Identity-based online/offline encryption," Financial Cryptography and Data Security, 2008, pp. 247-261, Springer-Verlag, Australia (17 pages).

Guo et al., "UBAPV2G: A Unique Batch Authentication Protocol for Vehicle-to-Grid Communications," IEEE Transactions on Smart Grid, Dec. 2011, pp. 707-714, vol. 2, No. 4, Singapore (8 pages).

Johnson et al, "Homomorphic Signature Schemes," CT-RSA, 2002, pp. 244-262, University of California at Berkeley, USA (18 pages).

Lamport, "Constructing digital signatures from a one-way function," Technical Report, SRI International; Oct. 18, 1979; pp. 0-7, USA (8 pages).

Li et al, "Multicast Authentication in Smart Grid with One-Time Signature," IEEE Transactions on Smart Grid, Dec. 2011, pp. 686-696, vol. 2, No. 4, USA (11 pages).

Liu et al., "Practical Broadcast Authentication in Sensor Networks," Mobile and Ubiquitous Systems: Networking and Services, The Second Annual International Conference on MobiQuitous, Jul. 2005, pp. 118-129, USA (11 pages).

Lu et al., "Review and Evaluation of Security Threats on the Communication Networks in the Smart Grid," Military Communications Conference, 2010, pp. 1830-1835, USA (6 pages).

Lysyanskaya et al., "Multicast Authentication in Fully Adversarial Networks," IEEE Symposium on Proceedings in Security and Privacy, 2004, pp. 241-253, USA (15 pages).

Maas, "Pairing-based Cryptography," Master's Thesis, 2004, Technische Universiteit Eindhoven, The Netherlands (92 pages).

Menezes et al., "Handbook of Applied Cryptography," CRC Press, 1996, ISBN: 0-8493-8523-7, USA (794 pages).

Miner et al., "Graph-Based Authentication of Digital Streams," IEEE Symposium on Proceedings in Security and Privacy, 2001, pp. 232-246, USA (15 pages).

National Institute of Standards and Technology, "Digital Signature Standard (DSS)," Federal Information Processing Standards Publication, FIPS PUB 186-3, Jun. 2009, USA (130 pages).

Neumann, "HORSE: An Extension of r-Time Signature Scheme with Fast Signing and Verification," In Proceedings of the International Conference on Information Technology: Coding and Computing, Apr. 2004, pp. 129-134, vol. 1, USA (6 pages).

Pannetrat et al., "Efficient Multicast Packet Authentication," In Proceedings of the 10th Network and Distributed Systems Security Symposium (NDSS '03), 2003, pp. 251-262, Europe (12 pages).

Park et al., "Efficient Multicast Packet Authentication Using Signature Amortization," In Proceedings of the 2002 IEEE Symposium on Security and Privacy (S&P'02), 2002, pp. 227-240, USA (14 pages).

Perrig, "The BiBa One-Time Signature and Broadcast Authentication Protocol," In Proceedings of the ACM Conference on Computer and Communications Security, Nov. 2001, pp. 28-37, USA (10 pages).

Perrig et al, "Efficient Authentication and Signing of Multicast Streams over Lossy Channels," In Proceedings of the IEEE Symposium on Security and Privacy, May 2000, pp. 1-9, USA (9 pages).

Perrig et al, "SPINS: Security Protocols for Sensor Networks," Wireless Networks, Sep. 2002, pp. 521-534, vol. 8, No. 5, USA (11 pages).

Pieprzyk et al, " Multiple-Time Signature Schemes Secure against Adaptive Chosen Message Attacks," Selected Areas in Cryptography (SAC), 2003, pp. 88-100, Australia (13 pages).

Rabin, "Digitalized Signatures and Public Key Functions as Intractable as Factorization," Technical Report, 1979, Cambridge, USA (20 pages).

Ren et al, "On Broadcast Authentication in Wireless Sensor Networks," IEEE Transactions on Wireless Communications, Nov. 2007, pp. 4136-4144, vol. 6, No. 11, USA (12 pages).

Reyzin et al., "Better than BiBa: Short One-time Signatures with Fast Signing and Verifying," In Proceedings of the 7th Australian Conference on Information Security and Privacy (ACIPS'02), 2002, pp. 144-153, Springer-Verlag, USA (9 pages).

Rivest et al, "A Method for Obtaining Digital Signatures and Public-Key Cryptosystems," Communications of the ACM, 1978, pp. 120-126, vol. 21, No. 2, USA (15 pages).

Schnorr, "Efficient Signature Generation by Smart Cards," Journal of Cryptology, 1991, pp. 161-174, vol. 4, No. 3, Springer-Verlag, New York City, USA (22 pages).

Song et al., "Expander Graphs for Digital Stream Authentication and Robust Overlay Networks," In Proceedings of the 2002 IEEE Symposium on Security and Privacy, May 2002, pp. 258-270, USA (13 pages).

Wang et al., "Time Valid One-Time Signature for Time-Critical Multicast Data Authentication," IEEE INFOCOM 2009, Apr. 2009, Champaign, USA (9 pges).

Wong et al., "Digital Signatures for Flows and Multicasts," IEEE/ACM Transactions on Networking, Aug. 1999, pp. 502-513, vol. 7, No. 4, USA (12 pages).

Yavuz et al., "HIMUTSIS: Hierarchical Multi-tier Adaptive Ad-Hoc Network Security Protocol Based on Signcryption Type Key Exchange Schemes," In Proceedings of the 21st International Symposium Computer and Information Services (ISCIS '06), 2006, pp. 434-444, Springer-Verlag, Germany (11 pages).

Yavuz et al., "NAMEPS: N-Tier Satellite Multicast Security Protocol Based on Signcryption Schemes," In Proceedings of the IEEE GLOBECOM Conference, 2006, Turkey (6 pages).

Zhou et al., "Multimedia Broadcast Authentication Based on Batch Signature," IEEE Communications Magazine, Aug. 2007, pp. 72-77, vol. 45, No. 8, USA (6 pages).

Zhou et al., "MABS: Multicast Authentication Based on Batch Signature," IEEE Transactions on Mobile Computing, Jul. 2010, pp. 982-993, vol. 9, No. 7, USA (6 pages).

* cited by examiner

| 304 → | 308 ↓ | 312 ↓ |
|---|---|---|
| YEAR [2012 - 20XX] | 0 | TIMESTAMP INDEX |
| MONTH [1 - 12] | 1 | TIMESTAMP INDEX |
| DAY [1 - 31] | 2 | TIMESTAMP INDEX |
| HOUR [0 - 23] | 3 | TIMESTAMP INDEX |
| MINUTE [0 - 59] | 4 | TIMESTAMP INDEX |
| SECOND [0 - 59] | 5 | TIMESTAMP INDEX |
| MILLISECOND [0 - 999] | 6 | TIMESTAMP INDEX |

FIG. 3A

| 316 → | 320 ↓ | 324 ↓ |
|---|---|---|
| SECONDS SINCE THE EPOCH FOR NEXT HOUR [3600 seconds] | 0 | TIMESTAMP INDEX |
| MILLISECONDS [3600 seconds] | 1 | TIMESTAMP INDEX |

SYSTEM AND METHOD FOR MESSAGE VERIFICATION IN BROADCAST AND MULTICAST NETWORKS

TECHNICAL FIELD

This disclosure relates generally to network communication, and, more particularly, to methods and systems for efficient verification of messages that are transmitted through a data network.

BACKGROUND

In modern communication networks, a large number of network devices send and receive network communication messages for a wide range of uses. In many applications, the receiver of a network communication message needs to be able to verify the authenticity of a communication message. As used herein, the term "verification" refers to a process for determining if a message is authentic and determining if the integrity of the message has been compromised. An authentic message means that the party purporting to be the sender of the message is in fact the party that sent the message. Message integrity refers to a determination that the contents of the message received by a recipient have not been altered after having been sent from the purported sender. Attackers attempt to forge communication messages that appear to be from a trusted sender, but that are not actually from the sender, or the attackers eavesdrop on legitimate messages from the sender and attempt to spoof the receiver with copies of the legitimate messages. The message verification process prevents the attacker from convincing the recipient that the message is from a trusted party or that the contents of a copied message can be trusted.

There are several existing techniques that enable a message recipient to verify network communication messages. Most of the existing techniques, however, are directed to unicast or one-to-one communications where a single sender communicates with a single recipient. In some network configurations, a network device sends multicast or broadcast messages to a plurality of recipient network devices. The term "broadcast" refers to sending a message to each of a plurality of other network devices that are associated as members of a single group, and the term "multicast" refers to sending a message to more than one, but less than all, of the associated network devices. One example of an associated group of network devices is a sensor network including a plurality of networked sensor devices that communicate with each other. Other examples include supervisory control and data acquisition (SCADA) systems and more broadly include groups of network devices that send and receive network messages with one another as part of embedded computer networks.

While existing message verification techniques can be applied to multicast and broadcast network devices, the existing techniques have limitations in broadcast and multicast networks. The network devices in many sensor networks have limited computational power and limited data storage space that render many traditional message verification techniques prohibitively expensive from a computational standpoint. For example, the traditional signature and verification process in public key cryptography can be too computationally expensive for such devices, especially when the devices must send time-critical messages. Existing techniques to improve the efficiency of public key cryptography, such as signature amortization, require that the verification process be spread over multiple communication messages. This requirement can delay the verification of the communication messages and present difficulties if one or more communication messages are lost or corrupted. Another public-private key technique uses one-time public/private signatures (OTS) to sign messages and verify. While the OTS techniques are more computationally efficient than using traditional public and private key techniques, the OTS system must distribute to each of the message recipients a large number of public keys that are used only once. In a broadcast or multicast network, the amount of data required to distribute the public keys to all of the recipients can overwhelm the network communication devices. Still other verification techniques use online/offline signature generation where a portion of the signature can be pre-computed prior to signing and sending a message. However, the online/offline signature systems either require a large amount of storage space to hold pre-computed data or require computationally expensive operations during message verification. Other forms of message verification including symmetric-key systems that are either less secure because all of the devices share a single secret key, or do not scale when each pair of devices needs to manage a separate set of secret keys.

As described above, existing techniques for message verification have various drawbacks, especially in broadcast and multicast systems with limited computing power and data storage. Given the above deficiencies with existing message verification techniques, improvements to message verification in data networks would be beneficial.

SUMMARY

In one embodiment, a method for verified communication with network devices has been developed. The method includes generating a digital signature of a hash for each one of a plurality of predetermined message elements with a private key in a first network device, generating a random number in the first network device, generating a one-time digital signature for the random number with the private key in the first network device. generating a network communication message including a subset of the plurality of predetermined message elements in the first network device, applying a first homomorphic operation to the one-time digital signature and the digital signatures corresponding to each the subset of predetermined message elements included in the network communication message to generate a signature for the network communication message, and transmitting the network communication message in association with the signature for the network communication message and the random number to at least one other network device.

In another embodiment, a network communication system configured to perform verified communication has been developed. The system includes a plurality of network devices. Each network device includes a network interface device, a memory, and a processor operatively connected to the network interface device and the memory. The memory is configured to store a plurality of predetermined message elements, a private key corresponding to the network device, a random device identifier corresponding to the network device, and a random device identifier and an associated public key corresponding to each of the other network devices in the plurality of network devices. The processor in a first network device in the plurality of network devices is configured to execute programmed instructions stored in the memory to generate a digital signature of a hash for each one of the plurality of predetermined message elements with the private key stored in the memory of the first network device, generate a random number, generate a one-time digital signature for the random number with the private key, generate a network communication message including a subset of the plurality of predetermined message elements, apply a first homomorphic operation to the one-time digital signature and the digital signatures for each hash of the predetermined message elements corresponding to each predetermined message element in the subset of predetermined message elements included in the generated network communication message to generate a signature for the network communication message, and transmit the network communication message in association with the signature for the network communication message and the random number with the network interface device to at least one other network device in the plurality of network devices.

DETAILED DESCRIPTION

For the purposes of promoting an understanding of the principles of the embodiments described herein, reference is now be made to the drawings and descriptions in the following written specification. No limitation to the scope of the subject matter is intended by the references. This patent also includes any alterations and modifications to the illustrated embodiments and includes further applications of the principles of the described embodiments as would normally occur to one skilled in the art to which this document pertains.

As used herein, the term "hash" refers to a numeric value generated for a set of input data by applying a cryptographically secure one-way hashing algorithm to the input data. By way of example, the SHA-1, SHA-2, and SHA-3 secure hashing algorithms generate fixed-length numeric hash values corresponding to inputs of varying lengths. For example, in different operating modes cryptographic hashes can generate fixed-length hashes of 160 bits, 256 bits, or 512 bits regardless of the size of the input data set. One property of cryptographically secure hashes that is of interest to message verification is collision resistance to chosen message inputs. That is to say, given a first set of input data I, the hashing algorithm generates a numeric hash H that is impractical for identifying another input I' that produces the same hash H. A collision occurs when two different inputs to a hash function produce the same hash H, and cryptographically secure hashes make finding collisions infeasible, although collisions can occur in theory for inputs that are longer than the length of the hash H. Consequently, an attacker cannot generate forged input data I' that produces the same hash H corresponding to a valid message input I. In a public key cryptographic protocol, a signature for a message is typically generated by applying the private key of the sender to the cryptographic hash value of the message instead of applying the private key to the contents of the message. Signing the hash prevents an attacker from forging a message that generates the same signature as the legitimate message, which an attacker can forge even if the attacker does not have access to the private key.

As used herein, the terms "public key" and "private key" refer to a pair of keys that are used in conjunction with an asymmetric cryptographic protocol to verify a communication message. In a verified communication process, the private key is known only to the signing party, such as a network device. In general, the public key is known to the "public" at large, including recipient network devices. The public key is used to verify that a network communication message purporting to be from a sender having the corresponding private key is not a forgery and has not been subjected to tampering. A verification process uses the public key associated with the sender and the signature that is associated with the network communication message to check the authenticity and integrity of the message contents. In the discussion below, a signing operation on a digital data D using the private key, sometimes referred to as the "secret key" sk, is denoted as the function $SGN.Sig_{sk}(D)$. The digital data are typically a hash value corresponding to the digital information that is being signed. To verify a signed message, the recipient performs a verification operation using the public key corresponding to the private key that signed the message. The verification operation is denoted as the function $SGN.Ver_{PK}(D,s)$, where PK is the public key, D is the data that was signed with the private key, and s is the signature generated with the private key. The recipient can verify that the message was in fact signed using the private key while only having access to the public key, message data, and the signature.

As used herein, the term "nonce" refers to a "number only once," which is a random number that is generated and used only one time for a single communication message sent from a network device. The term "one-time signature" refers to a signature that the network device generates with the private key of the nonce. As described in more detail below, the use of a different nonce and one-time signature with each communication message prevents an attacker from monitoring a large number of communication messages in order to forge communication messages that appear to be from a sender.

As used herein, the term "message element" refers to digital data that forms a portion of a larger communication message. A digital message with a predetermined format includes multiple message elements that are selected from a predetermined set of potential message elements used to form the communication message. The message elements are arranged in a predetermined format in the communication message. One exemplary communication message format includes fields A, B, and C. Each of these fields can include a predetermined set of message elements. Some fields can include exactly one message element, while other fields further comprise multiple message elements. As described below, a sender generates a digital signature corresponding to each message element using a private key to sign a hash formed from both the digital data in the message element and one or more index numbers that identify the position of the message element in the predetermined message format. A digital signature for the entire communication message is then generated using the individual signatures of the message elements.

Figure 1:
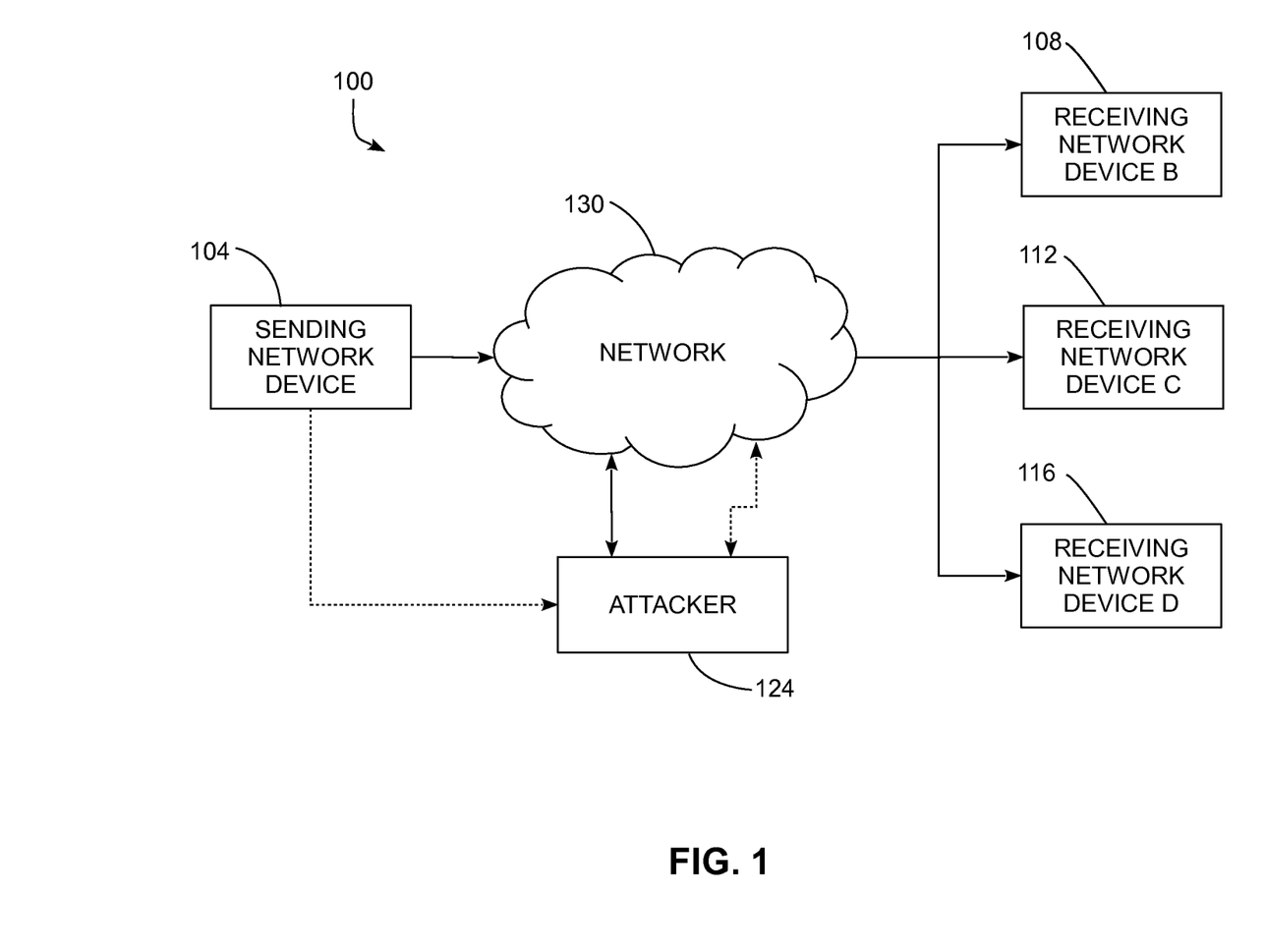
FIG. 1 is a schematic diagram of a data network including plurality of network devices that send and receive communication messages and an attacker.

FIG. 1 depicts a network communication system 100. The system 100 includes a plurality of network devices 104, 108, 112, and 116 that send and receive communication messages through a network 130. While FIG. 1 depicts four network devices 104-116, the system 100 can include a different number of network devices. The network devices 104-116 are all computing devices that are configured to send and receive communication messages using a message format including predetermined message elements. The network devices 104-116 can be any of a wide range of computing devices including personal computers (PCs), servers, smartphones, tablets, embedded computing systems, and the like. While the network devices 104-116 are described as having the same hardware and software configuration for illustrative purposes, a wide range of devices including different hardware and software configurations can be configured to operate in the system 100. In one embodiment, the network devices 104-116 are sensor devices in a sensor network or other devices in a supervisory control and data acquisition (SCADA) system. In some embodiments, each network device is configured to send communication messages to either all of the other network devices in the system in a "broadcast" mode or to a plurality of other network devices in a "multicast" mode. In FIG. 1, for example, the network device 104 sends a network communication message to each of the other network devices 108, 112, and 116. In an exemplary multicast message transmission, the device 104 sends a communication message to the recipient network devices 108-116 that are selected from a larger group 118 of network devices 118 in the system 100.

The network 130 can be any digital network such as the Internet, a local area network (LAN), or another wide area network (WAN). In one embodiment, each of the network devices includes a wireless network interface device and the network devices communicate with each other either directly or using a peer-to-peer mesh network. In the wireless mesh network configuration, the network 130 does not require additional hardware beyond the network devices 104-116.

FIG. 1 depicts an attacker 124. The attacker 124 is another computing device that is not supposed to be part of the system 100, but that has the ability to both eavesdrop on communication messages that are sent through the network 130 and to send forged communication messages to the network devices 104-116. In some configurations, the attacker 124 can intercept a communication message from one of the network devices, such as the device 104 in FIG. 1. The attacker can forge new communication messages and attempt to convince the network devices 108-116 that the device 104 sent the forged message, or can simply repeat a valid network communication message in a "replay" attack. As described below, the network devices 104-116 generate signatures for the communication messages and verify the communication messages to prevent the attacker 124 from successfully forging new messages or from successfully replaying old communication messages. Thus, the system 100 remains secure from the attacker 124 assuming that the attacker does not have access to the private key and message element signatures that are stored within each of the network devices 104-116.

Figure 2:
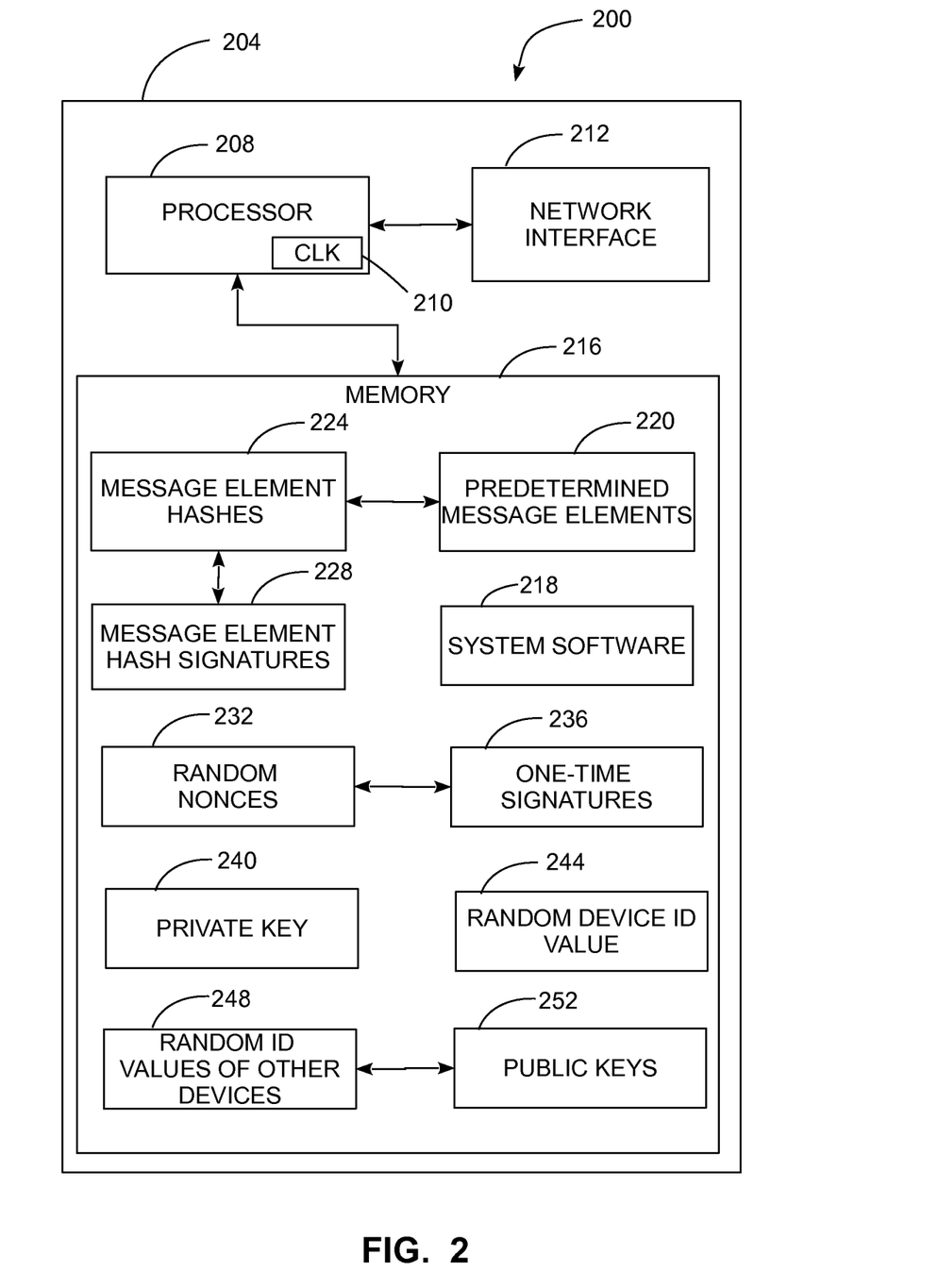
FIG. 2 is a schematic diagram of an exemplary network device.

FIG. 2 depicts components in an exemplary network device 200 and data stored in a memory within the network device 200. Each of the network devices 104-116 of FIG. 1 incorporates the configuration of the device 200. The network device 200 includes a housing 204 that supports a processor 208, network interface device 212, and a memory 216. The processor 208 is a central processing unit (CPU), microcontroller, field programmable gate array (FPGA), application specific integrated circuit (ASIC) or any other suitable digital logic device that is configured to generate communication messages, sign the communication messages, and verify the received communication messages. The processor 208 includes an internal clock 210 that maintains the current time. The clock 210 can be set periodically from a reference clock. In one embodiment, the processor 208 sends network time protocol (NTP) messages to an external time server (not shown) with the network interface 212 to set the clock 210. The processor 208 can optionally include a hardware random number generator (RNG) instead of or in addition to using software random number generation techniques.

The network interface 212 can include both wired and wireless network interface devices such as Ethernet, 802.11 wireless transceivers, Bluetooth transceivers, and the like. The memory 216 includes both non-volatile data storage devices and volatile data storage devices. Examples of non-volatile data storage devices include magnetic disks, optical disks, solid-state data storage devices, and any other digital storage device that retains data when the network device 200 is not connected to an electrical power source such as an electrical power grid or battery. Examples of volatile data storage include dynamic and static random access memory (RAM) or other data storage devices that retain digital data only when the network device is connected to the electrical power source.

During operation of the network device 200, the processor 208 stores and retrieves data from the memory 216. The memory 216 stores system software 218, a predetermined set of message element data 220, hash values 224 corresponding to the message elements, message element hash signatures 228, random nonces 232, one-time signatures of the random nonces 236, a private key 240, a random identifier 244 assigned to the network device 200, random device identifiers of other network devices 248, and public keys 252 associated with the other network device identifiers. Some communication message formats include the random device identifiers 248 of the other network devices in the system 100 as message elements in network communication messages. Thus, the identifiers of the other network devices 248 can be included with the message elements 220, and the memory 216 further includes hash values 224 and message element signatures of the hashes 228 corresponding to the random device identifier values 248.

In the memory 216, the programmed software instructions 218 typically include operating system (OS) software and programmed instructions to enable the processor 208 to generate new communication messages, generate signatures for the communication messages, and to verify the authenticity and integrity of communication messages received with the network interface 212. In particular, the system software 218 can include cryptographically secure hash functions, random number generators and pseudo-random number generators, and software to implement an asymmetric cryptographic protocol such as the Rivest-Shamir-Adleman (RSA) protocol. As described in more detail below, different sets of data stored in the memory 216 are associated with other sets of data. The memory 216 can include a database or other data structures to enable efficient access to related data in the memory 216.

The memory 216 also stores the predetermined message elements 220 that are combined to form communication messages, hash values 224 that are generated for each of the predetermined message elements, and signatures 228 for each of the message element hashes 224. The message elements 220, hashes 224, and hash signatures 228 are stored in association with each other in the memory 216. The message element hash signatures 228 are stored in the memory 216 and are not revealed to other computing devices, including the attacker 124, during operation of the network device 200.

The memory 216 also stores a plurality of random nonces 232 and corresponding one-time signatures 236. The processor 208 generates the nonces with a hardware random number generator, a software random number generator, or a pseudo-random number generator. The processor 208 signs each nonce using the private key 240 and stores the one-time signatures 236 in the memory 216. As described below, each nonce and one-time signature pair is used only one time as part of signing and verifying a single communication message.

The memory 216 stores the private key 240 associated with the network device 200. The processor 208 can generate the private key 240, or another computing device, such as a PC, can generate the private key and store the private key in the memory 216. The processor 208 uses the private key to generate the message element hash signatures 228 and the one-time signatures 236.

The memory 216 stores a random identifier value 244 that is included with communication messages to identify the network device 200 to other network devices. The processor 208 generators the random identifier value 244 or the random value is generated externally and stored in the memory 216. The identifier value is randomized to reduce the likelihood of collisions using a hash function to generate a signature for communication messages, which is described in more detail below. The random device identifier typically has a length of 128 bits or longer to provide a large potential pool of random device identifiers. The attacker 124 can spoof the random identifier value 244 in a forged message, but the random identifier value is still useful in identifying the purported sender of the communication message. The memory 216 also stores random identifiers 248 of other network devices in association with the public keys 252 of the other network devices. When the network device 200 receives a communication message, the network device 200 identifies one of the public keys 252 that corresponds to the random device identifier 248 in the communication message. The public key is then used to verify the contents of the communication message.

Figure 3A:
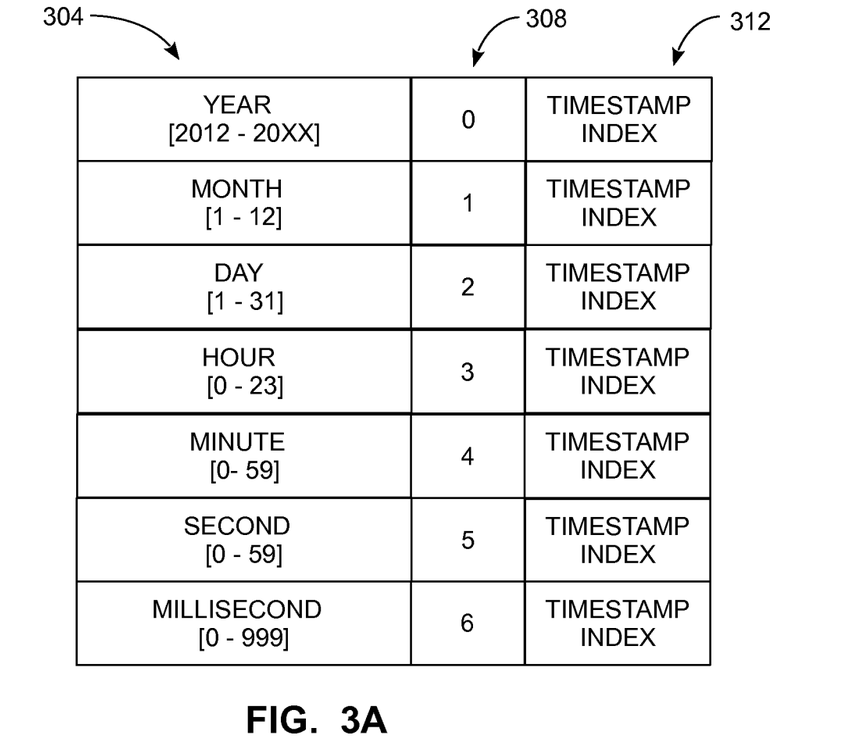
FIG. 3A is a table of timestamp elements used to generate a timestamp for a communication message.
Figure 3B:
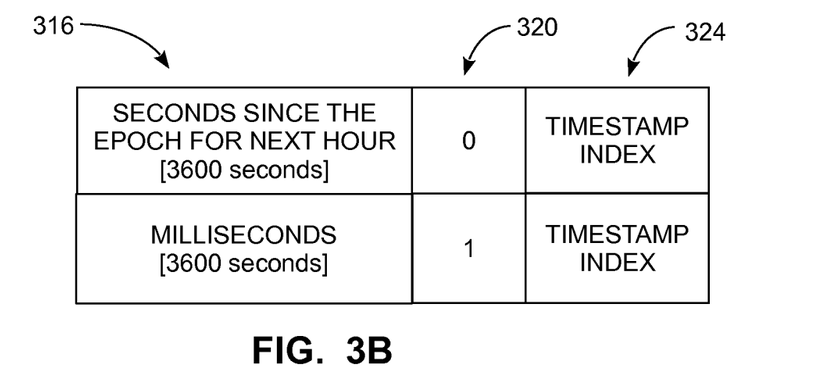
FIG. 3B is another table of timestamp elements used to generate a timestamp for a communication message.

Each communication message includes a timestamp that corresponds to the time that the sender generated and sent the communication message. The network device 200 stores timestamp data as part of the message elements 220, and each timestamp element has a corresponding hash value 224 and hash signature 228. FIG. 3A and FIG. 3B depict two different sets of data elements for forming a timestamp in a communication message. In FIG. 3A, a timestamp is generated using one message element from a series of message elements 304 including the year, month, day of month, hour, minute, second, and millisecond corresponding to the time that the message is generated. The values for the different elements are indexed in a predetermined order within the timestamp using the index values 308 and the entire timestamp is indexed within a larger communication message with a timestamp index value 312.

FIG. 3B depicts another timestamp format includes message elements 316 with two fields for the number of seconds and milliseconds since the epoch. Seconds since the epoch is a time system used with many computing devices to identify the time as an integer number of seconds. In FIG. 3B, a limited number of seconds into the future are stored as message elements 220 in the memory 216, such as 3600 seconds corresponding to the next hour of time from the present time. The inclusion of milliseconds increases the precision of the timestamp. The timestamp message elements in FIG. 3B are also indexed within the timestamp with index values 320 and the entire timestamp is indexed within a larger communication message with the timestamp index value 324. FIG. 3B can be used to limit the number of message elements and corresponding signatures for the timestamp that are stored in the memory 216 at any one time. The processor 208 deletes older seconds since the epoch values and signatures from the memory 216 and generates new timestamp values and signatures in an offline mode so that timestamps and signatures are available for use in additional communication messages.

As described below, the index values are used to generate hashes and signatures for the timestamp message elements, but are not directly included in the communication message. The index values prevent an attacker from rearranging the positions of timestamp elements to form a forged message with a valid signature. The hash values and signatures for different timestamp elements are generated and stored in the memory 216 in an offline mode in advance of the time that the network device 200 generates a new communication message. The timestamp message element signatures are typically generated for a limited time window into the future from the present time with reference to how often each timestamp value changes. For example, the memory 216 stores sixty signatures for each of the second and minute timestamp values, but only stores a single signature for the year, which changes much less frequently. The timestamp formats depicted in FIG. 3A and FIG. 3B are illustrative of two timestamp formats, but other formats that include greater or lesser precision in identifying the time of a network communication message can be used as well.

Figure 5:
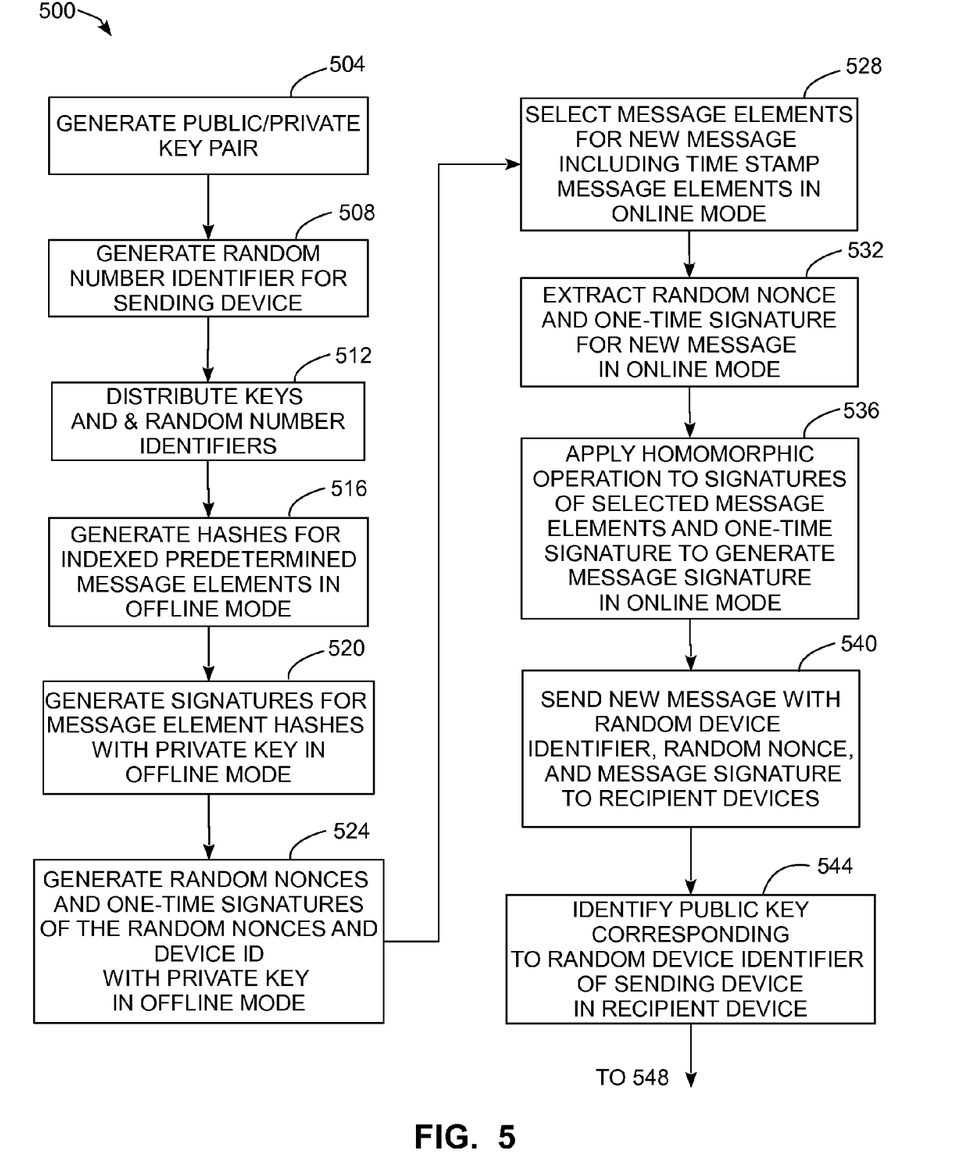
FIG. 5 is a block diagram of a process for signing and verifying a communication message.

FIG. 5 depicts a process 500 for generating signatures for communication messages in a first network device, which is referred to as the sender or sending device, and verifying the signed communication messages in at least one other network device, which is referred to as the recipient or receiving device. Process 500 is described in conjunction with the network communication system 100 of FIG. 1 and the exemplary network device 200. In the discussion below, a reference to the process 500 performing a function or action refers to a processor, such as the processor 208, executing programmed instructions stored in a memory to perform functions or actions.

Process 500 can optionally begin with generation of a public-private key pair for the sending device (block 504). In process 500, the public-private key pair is generated using an asymmetric cryptographic protocol that includes a homomorphic property. The homomorphic property means that a homomorphic operation applied to individual signatures, each of which is generated by applying the private key to individual message elements or hashes of individual message elements, to produce a combined signature that has the same value as another signature generated with the homomorphic operation applied to the individual message elements or the hashes of the individual message elements followed by the generation of the signature by applying the private key to the result of the homomorphic operation on the individual message elements or the hashes of the individual message elements.

This homomorphic property can be expressed mathematically as $\Pi_{j=0}^{i} \text{SGN.Sig}_{sk}(M_j) = \text{SGN.Sig}_{sk}(\Pi_j^i(M_j))$ where SGN is the sender that produces signatures using the private, or "secret" key $\text{Sig}_{sk}$. $M_j$ can represent a plurality of j individual message elements or a plurality of j hashes of the j individual message elements. In the left-hand side of the equation, a signer SGN signs the individual message elements or hashes of the individual message elements first, and then the individual signatures are combined with a homomorphic operation. On the right-hand side of the equation, the homomorphic operation is applied directly to the individual message elements or hashes of the individual message elements $M_j$ first, and then SGN produces a single signature by applying the private key to the result of the homomorphic operation on the individual message elements or hashes of the individual message elements. In the previous equation, the homomorphic operation is exemplified by a multiplicative series Π, but other homomorphic operations include a summation (Σ) series, a series of pairing operations, or any other operation that preserves the homomorphic property for signatures with the private key. As described below, the homomorphic operation for some signature protocols include a combination of two or more mathematical operations that are applied to the individual signatures during generation of a signature for the full message and to message elements or hashes of message elements during the message verification process.

The RSA protocol is an example of a commercially available asymmetric cryptographic protocol that generates signatures that are suitable for use with the homomorphic operations described in process 500. In addition to RSA, other cryptographic signature protocols, such as the Boneh-Lynn-Shacham (BLS) or Schnorr aggregate signature protocol, include a homomorphic property that is suitable for use with the process 500.

During process 500, the sending device generates the individual signatures $SGN.Sig_{sk}(M_j)$ in the equation above, but does not need to generate the combined signature $SGN.Sig_{sk}(\Pi_j^l(M_j))$ above to produce a signature for a communication message. Because using a private key to generate a signature for a new message is computationally intensive, the sender does not need to generate a new signature corresponding to the message made of the individual message elements $M_j$ with the private key.

Process 500 continues as the public keys, associated random number device identifiers, and private keys are distributed to network devices (block 508). Each network device receives only one private key that is stored in an internal memory and is not transmitted or otherwise revealed to any other device. The public keys for each of the remaining devices in the system are stored in the memory of each network device in association with the random device identifiers for each device. For example, network device 104 stores public keys corresponding to the network devices 108, 112, and 116 to verify the authenticity and integrity of communication messages that are purported to be from the other devices in the system 100. As described below, each communication message includes the random identifier for the sending device, and the recipients use the random identifier to identify the appropriate public key to use for verifying the message contents.

In one embodiment, the public keys 252 are stored in the memory 216 of each network device and are accepted as valid by fiat. For example, public keys can be stored in the network devices during an initial configuration procedure and the devices accept messages corresponding only to messages validated with one of the public keys. In another embodiment, a public key infrastructure (PKI) system generates certificates from a trusted signing authority and the network devices accept public keys as valid only if the certificate authority signs the public key. The PKI infrastructure can be used to distribute public keys through the untrusted network 130 to ensure that only valid public keys are accepted by the network devices 104-116 instead of a public key generated by the attacker 124.

The public-private key generation and distribution describe above in the processing of block 504-512 is typically performed during an initial device configuration process for the network devices that occurs before the network devices are activated and begin sending and receiving communication messages. In some instances, the public-private key pairs are generated with another computing device, such as a personal computer (PC), which can generate public-private key pairs and distribute the keys to the network devices. The random device identifiers are also distributed to the network devices in association with the corresponding public keys of each device. The public-private key generation and distribution with random device identifiers typically occur once prior to operation of the network devices to send and verify a plurality of network messages during operation.

Figure 4:
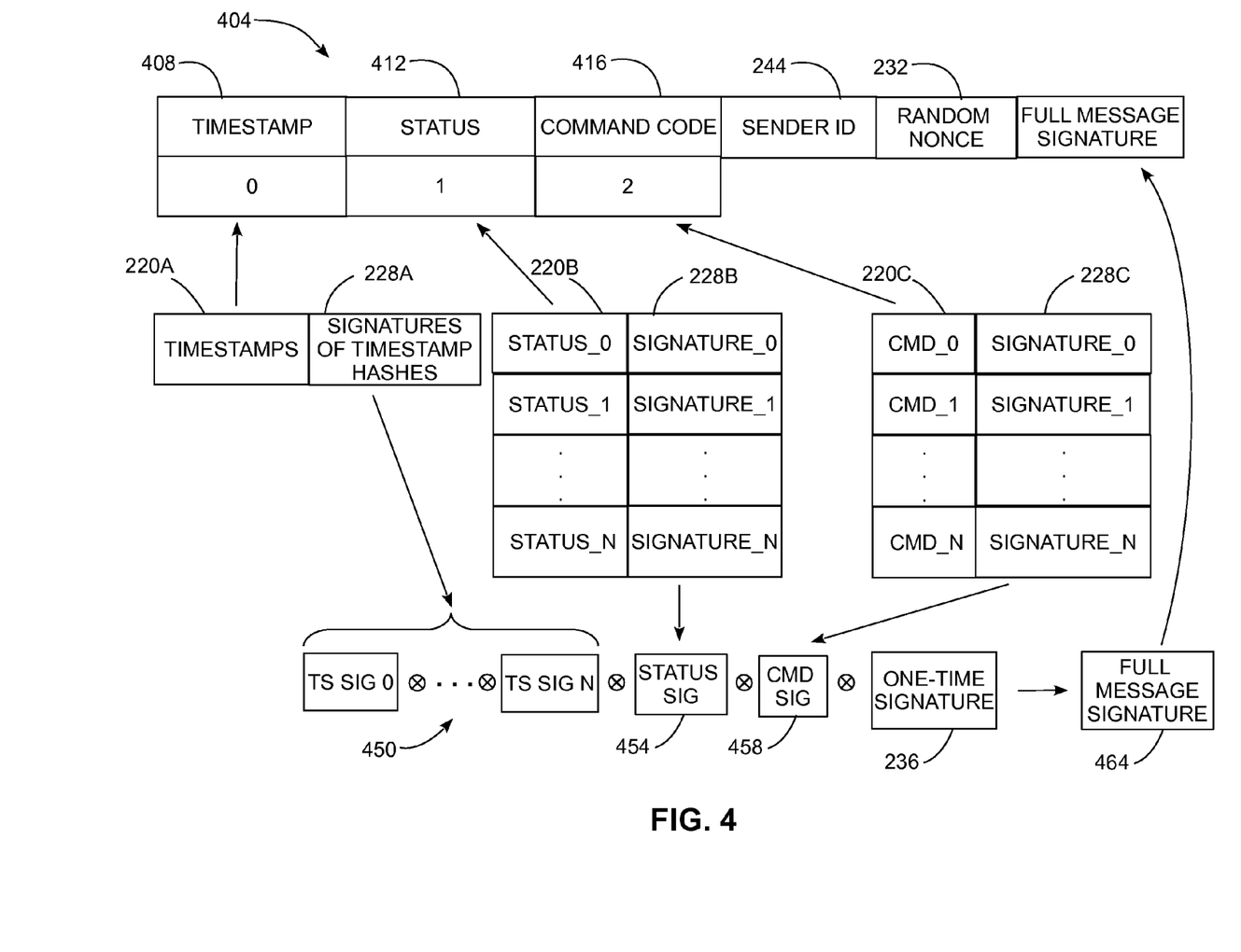
FIG. 4 is a depiction of message elements and message element signatures in an exemplary communication message format.

Process 500 continues as a computing device, typically the sending device but optionally another computing device, such as a PC workstation, generates hash values for each of a predetermined plurality of message elements including an index value corresponding to the position of each element in a communication message (block 516). The message elements are a discrete set of data that can be included in a communication message. The network devices in the system 100 send and receive structured communication messages that comprise multiple message elements. FIG. 4 depicts an example of one type of structured message format. In FIG. 4, a communication message 404 includes message elements corresponding to a timestamp 408, message recipient identifier field 412, and a command code 416. The communication message 404 also includes the identifier 244 of the network communication device that sent the message, one of the random nonces 232, and a full message signature 464 that is generated for the communication message. The timestamp field 408, message recipient identifier field 412, and command code field 416 are indexed in order with reference to a predetermined order of the fields in each communication message. The timestamp field 408 can include multiple individual timestamp elements 220A that are combined to form a timestamp. For example, as depicted in FIG. 3A, the timestamp can include year, month, day, hour, minute, second, and millisecond elements. The message recipient identifier field 412 includes one or more of the random recipient identifiers 248 that are stored in the memory 216 and that correspond to one or network device recipients for the message 404. The message 404 can include one or more of the recipient identifiers 248 for sending the message 404 in unicast, multicast, or broadcast mode to the other network devices in the system 100. The command code field 416 includes one or more commands 220C directed to one or more of the other network devices in the system 100. The command code 416 can, for example, request that the recipients perform an action or query other devices for information.

To generate the indexed hashes, process 500 concatenates the index value of the predetermined location of the message element in the message to the message element and generates a hash value corresponding to the message element and concatenated index value. Using the timestamps in FIG. 3A as an example, each of the message element values 0-31 corresponding to the "day of month field are concatenated with the index value "2" corresponding to the location of the day of month data element in the timestamp. The hash function H generates a hash H(Day||2) where the "||" operator indicates concatenation.

The concatenation of the index values to data elements prevents an attacker from generating a forged message that includes a rearrangement of otherwise valid message elements. For example, an attacker might record a message that is sent on March 8 (month=3, day=8), and subsequently try to send the same message on August 3 (month=8, day=3) simply by rearranging the month and day fields in the first message. The introduction of index values when generating cryptographic hashes prevents the rearrangement attack because the concatenated index numbers change the hashed value generated for each data element. The concatenated index value is not included in the message element when the communication message is sent, however. As described below, a recipient generates hash values for the message elements in a received message and concatenates index values based on the position of each data element in the message. The data elements in the message must be in the correct order or the hash values generated at the recipient during the verification process do not correspond to the signature and the recipient rejects the forged message.

More complex message formats can include multiple levels of indexing. For example, the timestamp 408 in message 404 includes an index value for each of the individual timestamp elements, and additionally includes a "0" concatenated to each data element in the timestamp 408 to indicate that the timestamp 408 is the first data element in the communication message 404. In FIG. 4, the hash for the day of month field is H(Day||2||0) to indicate the index of the day of month within the timestamp at index 2, and the overall position of the timestamp in the communication message 404 at index 0. Because the communication message 404 has a predetermined format, the recipients of the message can extract the individual fields of the message and assign index values based on the predetermined message format. The message recipient identifier field 412 and command element field 416 can similarly include multiple levels of indexing to enable the message 404 to include multiple message recipient identifiers or multiple commands.

The predetermined message format depicted in FIG. 4 is exemplary of one type of structured message format, but a wide range of message formats can be used with process 500. For example, the order of individual fields in the message format can be selected in any manner as long as both the sender and recipient recognize a common communication message format. Additionally, while the index values are depicted as being appended to the end of the message elements 220A-220C to generate hash values and signatures, the index values could be prepended to the beginning of each message element instead.

Referring again to FIG. 5, process 500 continues by generating signatures for the indexed hash values (block 520). The network device uses the private key to generate a signature for each hash value and stores the signature in memory in association with the message data element corresponding to the hashed value. The signature only needs to be generated and stored once for each message element.

In addition to generating hash values and signatures for message data elements, the network device also generates the random nonces 232 and one-time signatures 236 for a plurality of communication messages (block 524). The nonces 232 are generated with either a hardware random number generator in the network device or a software random number generation process that is executed by the processor 208. In one embodiment, the network device generates nonces with a pseudo-random number generator that operates with a seed value that is generated randomly. The nonce values are generated over a wide numeric range to ensure that a single nonce is not used more than one time during operation of the network device. For example, nonces with lengths of 128 bits or greater can be used in the system 100. The network device concatenates the nonce and the random device identifier and generates a signature for the cryptographic hash of the combined nonce and device identifier using the private key (SGN­.Sig$_{sk}$ (H(nonce||device ID))). The nonces 232 and corresponding signatures 236 are stored in the memory 216 and each communication message sent from the network device includes one nonce and the corresponding signature that is generated from the hash of the nonce and device identifier.

In the process 500, the processing described with reference to blocks 516-524 occurs in an "offline" operating mode. The offline operating mode means that the generation of signatures for the hash values of message elements and the generation of the nonces and one-time signatures occurs during time periods when the network device does not need to send a network communication message. Thus, when the network device needs to send a communication message, the signatures for each message element and a random nonce/one-time signature are already computed. The offline processing includes generation of hashes, random numbers, and cryptographic signatures that can be computationally intensive for network devices, particularly in embedded systems. The offline processing enables the network device to have all the data elements and signatures needed to generate a message without needing to perform the computationally intensive operations when the communication message is sent. For example, the network device can generate additional random nonces and sign the nonces between sending messages to ensure that nonces and one-time signatures are available for additional messages. The signatures for additional timestamp values can be generated before the timestamp values are needed as well.

Process 500 continues with the network device operating in an "online" mode to send a network communication message to one or more recipients. Network devices that are used in time-critical applications must be able to generate signed messages and send the messages within a short time frame. The online operations described below are computationally efficient for a wide range of network devices to enable the network devices to generate and deliver signed messages in a timely manner.

In the online mode, the network device first selects message elements for a new communication message using the message elements that are stored in memory (block 528). Communication messages are formed with a predetermined format such as the format of the message 404 in FIG. 4. The network device selects timestamp values corresponding to the present time, which is typically identified with a clock 210 in the processor 208. The network device also selects one or more appropriate recipient device identifiers 248 and command messages 220C for the communication message. The processor 208 marshals, or orders, the various message elements in the communication message in a predetermined order in accordance with the format of the communication message such as message 404.

Once the message elements for a new communication message are selected, process 500 generates a signature for the new message. The processor 208 extracts a random nonce 232 and corresponding one-time signature 236 from the memory 216 as part of the message signature (block 532). The random nonce 232 and one-time signature 236 are deleted from the memory after being used to sign one communication message.

Process 500 applies a homomorphic operation to the signatures corresponding to each of the selected message elements and the one-time signature to generate the signature for the full communication message (block 536). As depicted in FIG. 4, a homomorphic operator ⊗ is applied to the signatures of the timestamp element signatures 450 selected from the timestamp signatures 228A, one or more recipient identifier signatures 454 selected from signatures of the recipient identifier hashes 228B, command signature 458 selected from the command signatures 228C, and selected one-time signature 236. As described above, two homomorphic operations that can be performed efficiently by commonly used processors, such as processor 208, are multiplication and addition operations. Using a multiplication operation by way of example, the full message signature s' is s'=SGN.Sig$_{sk}$ (H(nonce∥device ID))·$\Pi_{j=0}^{k}$(SGN.Sig$_{sk}$(H(Message Element$_j$))). The term SGN.Sig$_{sk}$(H(nonce∥device ID)) is the one-time signature 236 and the terms SGN.Sig$_{sk}$(H(Message Element$_j$)) are the signatures 450-458 of the hash values for each of the selected message elements in the communication message 404. Thus, the full message signature 464 is the product or sum of the individual signatures 450-458 and 236, or the result of application of another appropriate homomorphic operation to the signatures. Because each of the message elements has already been signed and the one-time signature 236 has already been generated, the network device 200 does not need to use the private key 240 in the online operation to generate the full message signature 464 for the communication message 404.

The inclusion of the one-time signature 236 in the generation of the full message signature 464 masks the identity of the private key from attackers, such as attacker 124, who can eavesdrop and intercept multiple communication messages. As is known in the art, if the network device generated multiple messages with different combinations of the individual message elements, the attacker could use the different message element combinations and resulting full-message signatures to infer information about the signatures of individual message elements. After monitoring a plurality of communication messages, the attacker could identify the signatures for one or more of the message elements and then use the signature values to generate forged messages that would include valid signatures for the message elements even without access to the private key.

In a simplified example of an attack scenario, the signatures A, B, and C of three message element hashes are 3, 4, and 5, respectively, and the final signature is generated with a homomorphic multiplication operation. The attacker 124 could identify the signatures of the message elements A-C with a linear system of equations if one message includes A and B (A·B=12), another message includes A and C (A·C=15), and a third message includes B and C (B·C=20). The one-time signature 236 generated with reference to a hash of the combined device identifier 244 and random nonce 232, however, ensures that every full-message signature 464 includes a randomized component, which the attacker never sees in multiple communication messages. Applying the homomorphic operation to the signature values of the message elements 450-458 and the one-time signature 236 effectively masks the signatures 450-458 of the message elements from the attacker. Thus, the attacker 124 only sees the results of the homomorphic operation applied to the signatures of the message elements and the one-time signature, and cannot infer the signatures of individual message elements even if the attacker 124 observes every message sent through the network 130.

After generation of the signature for the full message, the message is sent to one or more recipients (block 540). In the example of FIG. 4, the full message 404 includes the data elements 408-416, the sender identifier 244, the random nonce 232 and the full message signature 464. In the example of FIG. 4, the full message signature 464 is appended to the communication message 404. For example, the sender 104 sends the message through the network 130 to at least one of the recipient network devices 108-116 in the system 100. In a broadcast configuration, each of the network devices 108-116 receives the communication message. In a multicast configuration, any two of the network devices 108-116 receives the communication message.

Process 500 continues as the recipient network device verifies if a network communication message that purports to be from a sender includes a signature that corresponds to the message elements. In the system 100, each of the recipient network devices 108-116 that receives the communication message verifies the contents of the message separately. The recipient network device first identifies a public key that corresponds to the sender device identifier in the network communication message (block 544). As described above, the memory 216 in the recipient stores device identifiers 248 and corresponding public keys 252 for the other network devices. The processor 208 retrieves the public key corresponding to the device identifier from the memory 216. In case the identifier in the message is not stored in the memory 216 (block 548), the recipient rejects the message (block 552).

The recipient also identifies the timestamp in the message (block 556). If the timestamp differs from the current time maintained in the internal clock 210 in the receiving network device by more than a predetermined amount (block 560), then the receiving network device rejects the message (block 552). The time difference threshold can be selected with reference to several factors including the expected clock drift between different network devices and expected latency for the message to reach the recipient. In different embodiments, the timestamp difference threshold can range from a few milliseconds to several tens of seconds. Thus, the clocks 210 in the network devices in the system 100 do not have to be perfectly synchronized in the system 100 for the recipient to accept the timestamp.

One use of the timestamp is to prevent the attacker 124 from performing a replay attack. In a replay attack, the attacker 124 records a communication message, and then transmits the exact same message to the recipients at a later time. If the attacker 124 waits past the predetermined timeout period, the recipients reject the message because the timestamp is out of date, and the attacker cannot change the timestamp because manipulation of the timestamp invalidates the signature with the message. The attacker 124 could potentially perform a high-speed replay attack in which the attacker sends a copy of the communication message within a brief time window so that the copied message arrives at the recipient within the predetermined time window. The recipient can be configured to counter this attack by rejecting identical copies of a message that arrive within the predetermined time period.

During process 500, the sender identifier and timestamp verification described in the processing of blocks 544 and block 556 can be carried out in any order once the message is received. The time check can optionally be performed after verification of the signature and contents of the message with the public key of the sender as described below.

In process 500, the recipient verifies that the message elements in the communication message match the signature included with the message using the public key of the identified sender. The recipient generates hashes for each of the message elements in the communication message (block 564). The recipient generates the hash values for the message elements in the same manner as the sender in the processing of block 516. The recipient also concatenates one or more index numbers corresponding to the position of each message element in the data message when identifying the hash values in the same manner as the sender. In some embodiments, the recipient stores the same predetermined set of message element hashes 224 in the memory 216 that the sender uses to generate the communication message. If the recipient has already generated the hashes 224 corresponding to the message element data, then the recipient can retrieve the hash values from the memory 216 instead of calculating the hash values for a new message. The use of predetermined hashes can reduce the computational load on the recipient during verification of the contents of the communication message.

The message recipient also generates a hash value for the concatenated random nonce and the device identifier of the sender, H(nonce||device ID) (block 568). Since each communication message includes a unique nonce, the recipient generates the hash value corresponding to the nonce and sender device identifier for each communication message. As part of the hash processing, the recipient checks the length of the random nonce to ensure that the nonce is of a sufficient length. For example, nonces of 128 bits or longer are selected from a numeric space that is large enough to ensure that nonces are not repeated during operation of the network devices. If the nonce is too short, the likelihood of the same nonce being used more than once increases. A properly configured network device in the system 100 should not generate nonces that are below a predetermined number of bits. Consequently, if the nonce is too short (block 570) then the communication message is rejected (block 552).

The sender device applies the homomorphic operation to the hash values of the message elements and to the hash of the combined nonce and sender device identifier values (block 572). In some signature protocols such as RSA, the recipient device applies the same homomorphic transformation to the hash values that the sender applied to the message element signatures and one-time signature. For example, the equation m'=H(nonce||device ID)·$\Pi_{j=0}^{k}$(Message Element Hash$_j$) applies the multiplication homomorphic operation to all of the hash values associated with the new message to generate a message digest m' in the same manner as the multiplication operation applied to signatures at the sender. Some signature protocols, such as RSA, use the same homomorphic operation during both signature generation and message verification. In other signature protocols, however, the homomorphic operation used to generate the signature differs from the homomorphic operation used to verify the message with the signature. For instance, the BLS signature protocol combines signature at the signer with a multiplication operation. The receiver verifies the combined full message signature using a combination of pairing and multiplication operations at the verification phase. When using the Schnorr signature protocol, the full message signatures are combined with modular addition, but the homomorphic signature verification operation includes a combination of modular exponentiation and multiplication operations to verify the message contents and the signature.

After generation of the message digest m', the recipient verifies if the message digest corresponds to the signature included in the message using the public key of the purported sender (block 576). The verification function is written as SGN.Ver$_{PK'}$(m',s') where SGN.Ver$_{PK'}$ refers to the signature verification function of the public key PK corresponding to the sender and s' is the signature included in the communication message. Use of a public key to verify a message digest given a signature generated with the private key is well known in the art. The homomorphic property of the individual signatures used by the sender and the hashes used by the recipient enables the sender to generate a message signature efficiently and for the recipient to verify the full message signature using the public key. Thus, the full message signature from the sender is a combination of individual signatures for the hash values of individual message elements and the recipient verifies the message using the public key and a message digest that corresponds to a combination of the hash values of the individual message elements.

If the verification function with the public key indicates that the message digest m' matches a message with the included signature s' (block 580), then the verification process succeeds and the recipient accepts the communication message as being a message sent from the sender with valid message contents (block 584). If the verification function indicates that the message digest m' does not match a message with the signature s' (block 580), then the recipient rejects the message (block 552).

As described above, process 500 enables the sender to generate a signed communication message in a time efficient manner and for multiple recipients to verify the authenticity and integrity of the message in a time efficient manner. While the messages include timestamps, the network devices do not have to be precisely synchronized to a single reference clock. Additionally, each communication message is signed and verified individually without depending on the signature of any other communication message. Therefore, if one communication message is lost or corrupted during transmission, other communication messages are affected by the lost communication message. Process 500 can be used for verification of unicast, multicast, and broadcast network communication messages between network devices.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method for verified communication comprising:
generating an individual digital signature of a hash for each one of a plurality of predetermined message elements with a private key in a first network device;
generating a random number in the first network device;
generating a one-time digital signature for the random number with the private key in the first network device;
generating a network communication message including a subset of the plurality of predetermined message elements in the first network device;
applying a first homomorphic operation to the one-time digital signature and each of the individual digital signatures corresponding to each the subset of predetermined message elements included in the network communication message to generate a homomorphic signature for the network communication message, wherein the momomorphic operation preserves a homomorphic property of a list of the individual signatures by the first network device; and
transmitting the network communication message, the homomorphic signature and the random number to at least one other network device so as to verify an integrity of said communication message at said other network device by using a second homomorphic operation.

2. The method of claim 1 further comprising:
receiving the network communication message in association with the homomorphic signature for the network communication message and the random number with the at least one other network device;
generating a hash for the random number with the at least one other network device;
generating a hash for each one of the message elements in the network communication message with the at least one other network device;
applying the second homomorphic operation to the hash of the random number and to the hash of each one of the message elements with the at least one other network device to generate a message digest of the network communication message; and verifying, with the at least one other network device, that the network communication message was generated by the first network device with reference to the message digest, the homomorphic signature for the network communication message, and a public key associated with the private key in the first network device.

3. The method of claim 2 further comprising:
generating a random identification number to identify the first network device with a random number generator;
distributing the public key corresponding to the private key of the first network device in association with the random identification number to the at least one other network device.

4. The method of claim 3, the generation of the one-time digital signature further comprising:
concatenating the random number and the random identification number to produce a concatenated random number; and
signing a hash of the concatenated random number with the private key to generate the one-time signature in the first network device.

5. The method of claim 4 further comprising:
transmitting the network communication message with the first network device in association with the random identification number; and
generating the hash for the random number with the at least one other network device as a hash of the random number concatenated with the random identification number.

6. The method of claim 2, the first homomorphic operation and the second homomorphic operation being the same operation.

7. The method of claim 6, both the first homomorphic operation and second homomorphic operation being a multiplication operation.

8. The method of claim 2, the first homomorphic operation being a multiplication operation and the second homomorphic operation being a pairing and multiplication operation.

9. The method of claim 2, the first homomorphic operation being a modular addition operation, and the second homomorphic operation being a modular exponentiation and multiplication operation.

10. The method of claim 1 further comprising:
storing the random number in association with the one-time digital signature in a memory in the first network device prior to generation of the network communication message.

11. The method of claim 2 further comprising:
generating an individual digital signature of a hash for each one of a plurality of message elements corresponding to timestamps with the private key in the first network device;
generating the network communication message including at least one message element selected from the plurality of message elements corresponding to timestamps, the at least one message element being selected to indicate a time at which the network communication message is generated; and
generating the homomorphic signature for the network communication message including the first homomorphic operation applied to each of the individual digital signatures for the plurality of message elements corresponding to timestamps.

12. The method of claim 11 further comprising:
identifying a time when the network communication message is received in the at least one other network device; and
verifying, with the at least one other network device, that the network communication message is valid in response to the timestamp in the network communication message being within a predetermined threshold of the identified time.

13. The method of claim 1 further comprising:
identifying an index number corresponding to each one of the plurality of message elements with reference to a predetermined format of the communication message;
generating the individual digital signature for each one of the plurality of predetermined message elements including the identified index number in the first network device with the private key; and
generating the communication message with the subset of predetermined message elements arranged in an order corresponding to the index number for each message element.

14. A network communication system comprising:
a plurality of network devices, each network device including:
a network interface device;
a memory configured to store:
a plurality of predetermined message elements;
a private key corresponding to the network device;
a random device identifier corresponding to the network device; and
a random device identifier and an associated public key corresponding to each of the other network devices in the plurality of network devices; and
a processor operatively connected to the network interface device and the memory, the processor in a first network device in the plurality of network devices being configured to execute programmed instructions stored in the memory to:
generate an individual digital signature of a hash for each one of the plurality of predetermined message elements with the private key stored in the memory of the first network device;
generate a random number;
generate a one-time digital signature for the random number with the private key;
generate a network communication message including a subset of the plurality of predetermined message elements;
apply a first homomorphic operation to the one-time digital signature and each of the individual digital signatures for each hash of the predetermined message elements corresponding to each predetermined message element in the subset of predetermined message elements included in the generated network communication message to generate a homomorphic signature for the network communication message, wherein the first homomorphic operation preserves a homomorphic property of a list of the individual signatures by the first network device; and
transmitting the network communication message, the homomorphic signature and the random number with the network interface device to at least one other network device in the plurality of network devices so as to verify an integrity of said communication message at said one other network device by using a second homomorphic operation.

15. The system of claim 14, the processor in the at least one other network device in the plurality of network devices being configured to:
- receive the network communication message with the network interface device in association with the homomorphic signature for the network communication message and the random number with the at least one other network device;
- generate a hash for the random number;
- generate a hash for each one of the predetermined message elements in the network communication message;
- apply the second homomorphic operation to the hash of the random number and to the hash of each predetermined message element with the at least one other network device to generate a message digest of the network communication message; and
- verify, with the at least one other network device, that the network communication message was generated by the first network device with reference to the message digest, the homomorphic signature for the network communication message, and a public key associated with the private key in the first network device.

16. The system of claim 15, the first network device being further configured to:
- generate a random identification number with a random number generator to identify the first network device;
- distribute the public key corresponding to the private key of the first network device in association with the identification number to the at least one other network device with the network interface device.

17. The system of claim 16, the processor in the first network device being further configured to:
- concatenate the random number and the random identification number to produce a concatenated random number; and
- sign a hash of the concatenated random number with the private key to generate the one-time signature.

18. The system of claim 16, the first network device being configured to:
- transmit the network communication message in association with the random identification number; and
- the processor in the at least one other network device being further configured to generate the hash for the random number as a hash of the random number concatenated with the random identification number.

19. The system of claim 15, the first homomorphic operation and the second homomorphic operation being the same operation.

20. The system of claim 19, both the first homomorphic operation and second homomorphic operation being a multiplication operation.

21. The system of claim 15, the first homomorphic operation being a multiplication operation and the second homomorphic operation being a pairing and multiplication operation.

22. The system of claim 15, the first homomorphic operation being a modular addition operation, and the second homomorphic operation being a modular exponentiation and multiplication operation.

23. The system of claim 14, the processor in the first network device being further configured to:
- store the random number in association with the one-time digital signature in the memory prior to generation of the network communication message.

24. The system of claim 14, the processor in the first network device being further configured to:
- generate an individual digital signature of a hash for each one of a plurality of message elements corresponding to timestamps with the private key;
- generate the network communication message including at least one message element selected from the plurality of message elements corresponding to timestamps, the at least one message element being selected to indicate a time at which the network communication message is generated; and
- generate the homomorphic signature for the network communication message including the first homomorphic operation applied to each of the individual digital signatures for the plurality of message elements corresponding to timestamps.

25. The system of claim 24, the processor in the at least one other network device being configured to:
- identify a time when the network communication message is received; and
- verify that the network communication message is valid in response to the timestamp in the network communication message being within a predetermined threshold of the identified time.

26. The system of claim 14, the processor in the first network device being further configured to:
- identify an index number corresponding to each one of the plurality of message elements with reference to a predetermined format of the communication message;
- generate the individual digital signature for each one of the plurality of predetermined message elements including the identified index number in the first network device with the private key; and
- generate the communication message with the subset of predetermined message elements arranged in an order corresponding to the index number for each message element.

* * * * *